United States Patent Office.

WILLIAM HENRY WALENN, OF LONDON, ENGLAND.

Letters Patent No. 103,947, dated June 7, 1870; patented in England, December 24, 1868.

IMPROVEMENT IN THE ELECTRO-DEPOSITION OF COPPER AND BRASS ON IRON AND STEEL.

The Schedule referred to in these Letters Patent and making part of the same.

*To all whom it may concern:*

Be it known that I, WILLIAM HENRY WALENN, of No. 19 Talbot Road, now called No. 74 Brecknock Road, Tufnell Park, West Holloway, in the county of Middlesex, in the United Kingdom of Great Britain and Ireland, civil engineer and electrician, have invented "Improvements in the Electric Deposition of Copper and Brass;" and I do hereby declare the nature of my said invention, and in what manner the same is to be performed, to be particularly described and ascertained in and by the following statement:

My invention consists in improvements in the electro-deposition of copper and brass upon iron and other substances, to be made with less battery power, with greater economy, and more solidly and perfectly than has hitherto been done.

A solution for electro-depositing brass is made as follows:

Crystallized sulphate of zinc, (one part by weight,) and crystallized nitrate of copper, (two parts,) are dissolved in the smallest quantity of water that is possible. Sufficient strong ammonia-water is added to precipitate, and then fully redissolve the oxides. Then the purple tint of this solution is completely removed by a standard solution of cyanide of potassium. The resulting solution should be left to stand for a day or two, and may then be worked with from one to three battery cells, using heat if a brass anode be employed. It is, however, preferred to work this solution by either of the porous-cell arrangements hereinafter described, the hydrated oxides of copper and zinc being from time to time supplied, and, if necessary, ammoniuret of copper being added. Before adding the hydrated oxides, it is advantageous to add as much of the cyanides of the metals as will dissolve in the menstruum.

Ammonia-water and a standard solution of cyanide of potassium should be added occasionally to this depositing liquid, in order to keep the salts of copper and zinc well in solution. The hydrated oxides of copper and zinc are mixed and thoroughly incorporated, in the proportion of two parts by weight of the hydrated oxide of copper to one part of the hydrated oxide of zinc, before they are added to the solution. During working, little or no hydrogen should be evolved from the article.

A second solution for electro-depositing brass, chiefly useful where heat is used, but also able to be employed cold with a porous-cell arrangement, is made as follows:

A solvent solution is first made, consisting of cyanide of potassium, (standard solution,) six parts by measure; nitrate of ammonium, (standard solution,) one part; sulphate of ammonium, (standard solution,) two parts. The "standard solution" of each salt consists of the salt in the solid form, dissolved in five times its weight of water. The standard solution of cyanide of potassium referred to in the description of the first electro-brassing solution is so made. Eight-ninths of the whole of the ingredients provided are mixed, in order to receive to saturation the cyanides of copper and zinc previously mixed, in the proportions of three thousand and ninety parts by weight of cupric cyanide, to one thousand seven hundred and ninety-five parts of zinc cyanide. The remaining one-ninth of the solvent solution is added as free solution to the eight-ninths. The mixture is then treated to the hydrated oxides of copper and zinc, as in the first solution, and the ammoniuret of copper is added, if it is found that this solution evolves hydrogen gas during deposition. Previous to trial by the battery, the solution should be allowed to stand for one or two days. A few ounces, (by measure,) to the gallon of ammoniuret of copper, will suffice to prevent the evolution of hydrogen gas. This method of mixing the solution is preferred to all others.

A modification of this second electro-brassing solution is made by mixing the whole of the solvent solution, and then dividing it into three parts: free solvent solution one part, solution to dissolve cupric cyanide five and one-third parts, solution to dissolve zinc cyanide two and two-thirds parts. When the respective metallic cyanides have been dissolved to saturation in the portions of solvent solution appropriated to them, the free solution is added thereto, and the whole is thoroughly mixed. Ammoniuret of copper is then added, and the finished solution is allowed to stand for a day or two. Instead of using the cyanides of copper and zinc respectively, to charge the above-mentioned "solvent solution" with copper and zinc oxides, carbonates, or any other suitable salt or salts, compound or compounds, of the metals, may be employed.

Another modification of this second electro-brassing solution, and one very nearly equal in quality to that first described, consists in charging the solvent solution with metal from a brass anode by electric power, using four Grove's cells of adequate size, and arranged for intensity for the purpose. After charging the solution with about two ounces of metal per gallon, the mixed cyanides are added, if it will dissolve any, then as much of the mixed oxides as it will dissolve, and finally, to adjust the solution for the non-evolution of hydrogen, a small quantity of ammoniuret of copper. This adjustment may or may not be necessary.

A serviceable modification of the solvent solution of the second electro-brassing solution consists in employing equal parts of cyanide of potassium and sulphate of ammonium, and adding thereto one ounce, (by weight,) of crystals of nitrate of ammonium per gallon. The nitrate of ammonium is necessary, as it favors electric conduction, and tends to keep the solution in working order.

If a solution to electro-deposit copper be required, instead of charging the solvent solution with about one part of zinc to two parts of copper, it is charged with one part of zinc to ten or twenty parts of copper. This part of the invention refers to any alkaline solution, but more particularly to that containing cyanide of potassium and tartrate of ammonium, and to the two brass solutions described above. The addition of sulphate of zinc to acid solutions for electro-depositing copper, has long been known to improve the quality of the deposit. This addition is not included in this invention. The presence of zinc toughens the cupreous deposit.

In a porous-cell arrangement for electro-brassing or electro-coppering, the surface of the solution next the zinc, or other dissolving plate, is at a greater elevation than that of the external or depositing solution. This plan tends to keep the depositing solution in working order. Although it is preferred, it is not claimed as a portion of this invention.

The next part of this invention refers to rendering alkaline brass and copper electro-depositing solutions free from the evolution of hydrogen gas, or nearly so, during electro-deposition, thus enabling the whole of the electric power to be utilized, and non-porous metal to be deposited. This is accomplished by adding to electro-brassing solutions the hydrated oxides of copper and zinc in sufficient quantity for the purpose.

Another method is, to add simply ammoniuret of copper. In a third method, the hydrated oxides of copper and zinc are dissolved in ammonia-water, and the resulting solution added to the depositing solution. In treating electro-coppering solutions according to this part of the invention, the hydrated oxide of zinc is not required. Although hydrated oxides are preferred, other oxides may be used.

The next improvement consists in applying to the brass and copper solutions mentioned above, being three brass solutions and the same number of copper solutions, and those only, the method of working them by the supply of the cyanides and hydrated oxides of the metal or metals, in conjunction with the use of a porous cell to generate the electric power, or to receive the same from an adequate battery, the said cyanides and hydrated oxides either being stirred into the solution from time to time, as required, or supplied from a tall porous cell containing an ammoniacal solution of the said cyanides and hydrated oxides, that acts, by the pressure of the column of liquid in the said porous cell, to force the ammoniacal liquid into the depositing solution outside the porous cell. When no separate battery is used, an amalgamated zinc plate in the porous cell furnishes the requisite electric current. The solution in the porous cell may be, first, the "solvent solution" of the second brass solution; second, a mixture containing cyanide of potassium and sulphate of ammonium in solution, equal parts, by weight, preferred; third, a solution of an alkaline chloride; fourth, a solution of an alkaline sulphate.

When a separate battery is employed, a brass or copper plate in the porous cell as an anode, and immersed in the "solvent solution" of a brass or copper solution, enables a portion of the said solution to be charged with brass or copper, while the other portion is parting with its brass to the cathode, and by the alternative use of these solutions as depositing solutions, continuous working may be obtained.

To obtain an acid solution for the electro-deposition of copper, a few drops of bi-sulphide of carbon per gallon of solution, (a larger proportion may be used,) are mixed with a solution containing one pound of sulphate of copper to the gallon, and an ounce or two of sulphate of zinc to the gallon. It is essential that this solution should be acid. The effect of this solution is, to deposit pure copper uniformly over the article to be coated, of a silky and bright appearance. The solution is not liable to get out of order.

Having thus described the nature of my invention, and the best means with which I am acquainted for carrying the same into effect, I desire it to be understood that I do not confine myself to the precise details or proportions herein set forth, as they may be varied without departing from the nature and object of my invention.

What I claim as new, and desire to protect by Letters Patent, is—

The improvements in electro-coating of iron or other articles with copper or brass, substantially as herein set forth.

In witness whereof, I, the said WILLIAM HENRY WALENN, have hereunto set my hand and seal, this 19th day of March, 1870.

W. H. WALENN. [L. S.]

Witnesses:
DOUGLAS I. HAMILTON,
M. WYNN,
    24 Royal Exchange, London.